(12) United States Patent
Roos

(10) Patent No.: US 8,698,370 B2
(45) Date of Patent: Apr. 15, 2014

(54) METHOD FOR PRODUCING THE ROTOR WINDING OF AN ELECTRICAL MACHINE, AND AN ELECTRICAL MACHINE WITH A ROTOR WINDING WHICH IS PRODUCED IN ACCORDANCE WITH THIS METHOD

(75) Inventor: Gerald Roos, Sasbachried (DE)

(73) Assignee: Robert Bosch GmbH, Stuttgart (DE)

( * ) Notice: Subject to any disclaimer, the term of this patent is extended or adjusted under 35 U.S.C. 154(b) by 471 days.

(21) Appl. No.: 12/918,494

(22) PCT Filed: Nov. 19, 2008

(86) PCT No.: PCT/EP2008/065857
§ 371 (c)(1),
(2), (4) Date: Nov. 23, 2010

(87) PCT Pub. No.: WO2009/103368
PCT Pub. Date: Aug. 27, 2009

(65) Prior Publication Data
US 2011/0127871 A1    Jun. 2, 2011

(30) Foreign Application Priority Data
Feb. 22, 2008  (DE) .......................... 10 2008 000 377

(51) Int. Cl.
*H02K 3/28*    (2006.01)
*H02K 15/02*   (2006.01)
*H02K 3/04*    (2006.01)
*H02K 21/22*   (2006.01)
*H02K 23/62*   (2006.01)
*H02K 57/00*   (2006.01)

(52) U.S. Cl.
CPC .. *H02K 3/04* (2013.01); *H02K 3/28* (2013.01); *H02K 21/22* (2013.01); *H02K 23/62* (2013.01); *H02K 57/00* (2013.01)
USPC ...... 310/177; 310/154.45; 310/198; 310/234; 29/596

(58) Field of Classification Search
CPC ........... H02K 3/04; H02K 3/28; H02K 21/22; H02K 23/62; H02K 57/00
USPC ................ 310/154.45, 177, 198, 234; 29/596
IPC ............................................... H02K 3/28, 15/02
See application file for complete search history.

(56) References Cited

U.S. PATENT DOCUMENTS 4,876,472 A * 10/1989 Shiraki et al. ................. 310/198
6,822,365 B2 * 11/2004 Mori .............................. 310/234
(Continued)

FOREIGN PATENT DOCUMENTS

DE   10 2004 062 813   7/2006
DE   10 2006 036 835   2/2008
JP   2007-282500       10/2007

*Primary Examiner* — John K Kim
(74) *Attorney, Agent, or Firm* — Merchant & Gould P.C.

(57) ABSTRACT

The invention relates to a method for producing the rotor winding of an electrical machine having at least four exciter poles in the stator (11) and having a commutator rotor (13) with a number of slots (N) and pole teeth (Z) which deviates from the number of exciter poles, and having a number of individual tooth coils (S) and laminations (L) which is at least twice as high as the number of pole teeth, wherein the individual tooth coils are wound, starting from the first coil (S1) onto in each case that pole tooth with the lowest angular error (Wf) in relation to a pole division (Pt). In order to permit non-critical guidance of the winding wire (17) in the region of the lamination connections, provision is made, at least in the case of a last-wound section (B) of the coils (S), preferably in the case of all of the coils, for the winding wire (17), with which contact is made by a lamination (L) in each case between two coils (S), to be fed from one side of the lamination (L) and guided away from the other side, and for at least one pole tooth (Z), but at most two pole teeth (Z) to be situated between the slot (N) from which the winding wire (17) of the lamination (L) is fed and the slot (N) at which said winding wire is guided away from the lamination (L).

2 Claims, 11 Drawing Sheets

(56) References Cited

U.S. PATENT DOCUMENTS

| | | |
|---|---|---|
| 2003/0014858 A1* | 1/2003 | Yamazaki et al. ............... 29/596 |
| 2005/0184612 A1* | 8/2005 | Cros et al. ..................... 310/158 |
| 2005/0269894 A1* | 12/2005 | Yamamoto et al. ........... 310/216 |
| 2006/0208605 A1* | 9/2006 | Aoyama et al. ............... 310/264 |
| 2006/0220489 A1* | 10/2006 | Osawa et al. .................. 310/198 |
| 2007/0152532 A1* | 7/2007 | Roos et al. ..................... 310/234 |
| 2007/0257572 A1* | 11/2007 | Nakano et al. .............. 310/68 D |
| 2008/0093943 A1 | 4/2008 | Roos |
| 2009/0058213 A1* | 3/2009 | Sugishima et al. ........... 310/198 |
| 2009/0309451 A1 | 12/2009 | Roos |
| 2011/0127871 A1* | 6/2011 | Roos ............................. 310/177 |

\* cited by examiner

| Spule | La | N | Polzahn | Wdg. | re/li | N | N | Le | |
|---|---|---|---|---|---|---|---|---|---|
| 1 | 1 | 10 | 3 | 14 | li | 5 | - | 8 | ⎫ |
| 2 | 8 | - | 5 | 15 | re | 7 | 8 | 15 | ⎬ a |
| 3 | 15 | 7 | 10 | 14 | li | 2 | - | 2 | |
| 4 | 2 | - | 2 | 15 | re | 4 | 5 | 9 | ⎭ |
| 5 | 9 | 4 | 7 | 14 | li | 9 | - | 16 | ⎫ |
| 6 | 16 | - | 9 | 15 | re | 1 | 2 | 3 | ⎬ b |
| 7 | 3 | 1 | 4 | 14 | li | 6 | - | 10 | |
| 8 | 10 | - | 6 | 15 | re | 8 | 9 | 17 | ⎭ |
| 9 | 17 | 8 | 1 | 14 | li | 3 | - | 4 | ⎫ |
| 10 | 4 | - | 3 | 15 | re | 5 | 6 | 11 | ⎬ c |
| 11 | 11 | 5 | 8 | 14 | li | 10 | - | 18 | |
| 12 | 18 | - | 10 | 15 | re | 2 | 3 | 5 | ⎭ |
| 13 | 5 | 2 | 5 | 14 | li | 7 | - | 12 | ⎫ |
| 14 | 12 | - | 7 | 15 | re | 9 | 10 | 19 | ⎬ d |
| 15 | 19 | 9 | 2 | 14 | li | 4 | - | 6 | |
| 16 | 6 | - | 4 | 15 | re | 6 | 7 | 13 | ⎭ |
| 17 | 13 | 6 | 9 | 14 | li | 1 | - | 20 | ⎫ |
| 18 | 20 | - | 1 | 15 | re | 3 | 4 | 7 | ⎬ e |
| 19 | 7 | 3 | 6 | 14 | li | 8 | - | 14 | |
| 20 | 14 | - | 8 | 15 | re | 10 | 1 | 1 | ⎭ |

FIG. 6

| Spule | La | N | Polzahn | Wdg. | re/li | N | Polzahn | Wdg. | re/li | Le |
|---|---|---|---|---|---|---|---|---|---|---|
| 1 | 1 | 10 | 3 | 10 | li | 5 | - | - | - | 8 |
| 2 | 8 | - | 5 | 7 | re | - | 8 | 7 | re | 15 |
| 3 | 15 | 7 | 10 | 10 | li | 2 | - | - | - | 2 |
| 4 | 2 | - | 2 | 7 | re | - | 5 | 7 | re | 9 |
| 5 | 9 | 4 | 7 | 10 | li | 9 | - | - | - | 16 |
| 6 | 16 | - | 9 | 7 | re | - | 2 | 7 | re | 3 |
| 7 | 3 | 1 | 4 | 10 | li | 6 | - | - | - | 10 |
| 8 | 10 | - | 6 | 7 | re | - | 9 | 7 | re | 17 |
| 9 | 17 | 8 | 1 | 10 | li | 3 | - | - | - | 4 |
| 10 | 4 | - | 3 | 7 | re | - | 6 | 7 | re | 11 |
| 11 | 11 | 5 | 8 | 10 | li | 10 | - | - | - | 18 |
| 12 | 18 | - | 10 | 7 | re | - | 3 | 7 | re | 5 |
| 13 | 5 | 2 | 5 | 10 | li | 7 | - | - | - | 12 |
| 14 | 12 | - | 7 | 7 | re | - | 10 | 7 | re | 19 |
| 15 | 19 | 9 | 2 | 10 | li | 4 | - | - | - | 6 |
| 16 | 6 | - | 4 | 7 | re | - | 7 | 7 | re | 13 |
| 17 | 13 | 6 | 9 | 10 | li | 1 | - | - | - | 20 |
| 18 | 20 | - | 1 | 7 | re | - | 4 | 7 | re | 7 |
| 19 | 7 | 3 | 6 | 10 | li | 8 | - | - | - | 14 |
| 20 | 14 | - | 8 | 7 | re | - | 1 | 7 | re | 1 |

FIG. 7
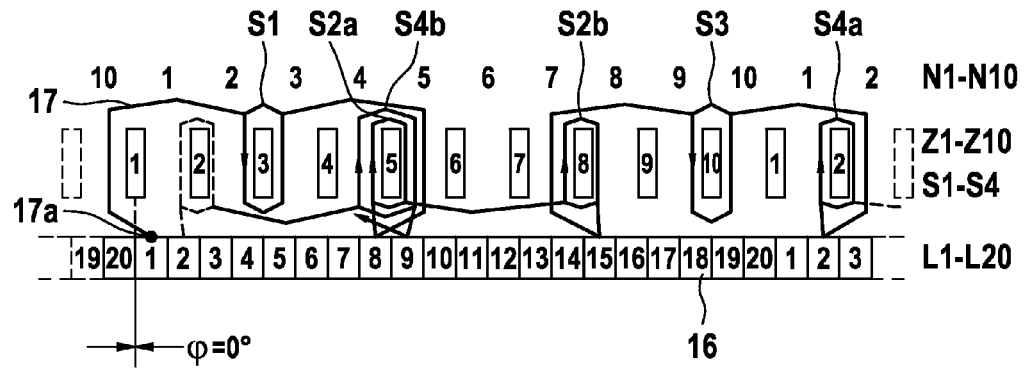
FIG. 8
| Spule | La | N | Z | Wdg. | re/li | N | Z | Wdg. | re/li | Le | |
|---|---|---|---|---|---|---|---|---|---|---|---|
| 1 | 1 | - | 3 | 10 | re | - | - | - | - | 8 | |
| 2 | 8 | - | 5 | 7 | li | - | 8 | 7 | li | 15 | } a |
| 3 | 15 | - | 10 | 10 | re | - | - | - | - | 2 | |
| 4 | 2 | - | 5 | 7 | li | - | 5 | 7 | li | 9 | |
FIG. 9
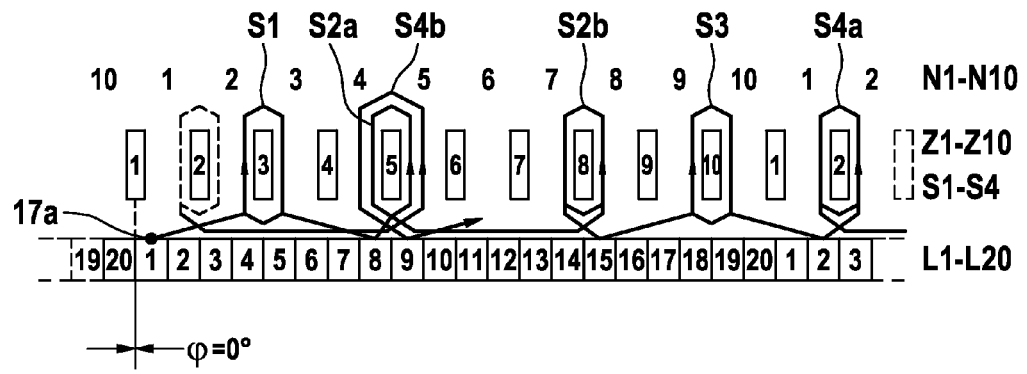

FIG. 10

| Spule | La | N | Polzahn | Wdg. | re/li | N | Polzahn | Wdg. | re/li | Le (a) |
|---|---|---|---|---|---|---|---|---|---|---|
| 1 | 1 | 10 | 1 | 6 | re | 8 | 6 | 6 | li | 8 |
| 2 | 8 | - | 3 | 7 | = | 10 | 8 | 6 | re | 15 |
| 3 | 15 | 7 | 8 | 6 | re | 5 | 3 | 6 | li | 2 |
| 4 | 2 | - | 10 | 7 | = | 7 | 5 | 6 | re | 9 |
| 5 | 9 | 4 | 5 | 6 | re | 2 | 10 | 6 | li | 16 |
| 6 | 16 | - | 7 | 7 | = | 4 | 2 | 6 | re | 3 |
| 7 | 3 | 1 | 2 | 6 | re | 9 | 7 | 6 | li | 10 |
| 8 | 10 | - | 4 | 7 | = | 1 | 9 | 6 | re | 17 |
| 9 | 17 | 8 | 9 | 6 | re | 6 | 4 | 6 | li | 4 |
| 10 | 4 | - | 1 | 7 | = | 8 | 6 | 6 | re | 11 |
| 11 | 11 | 5 | 6 | 6 | re | 3 | 1 | 6 | li | 18 |
| 12 | 18 | - | 8 | 7 | = | 5 | 3 | 6 | re | 5 |
| 13 | 5 | 2 | 3 | 6 | re | 10 | 8 | 6 | li | 12 |
| 14 | 12 | - | 5 | 7 | = | 2 | 10 | 6 | re | 19 |
| 15 | 19 | 9 | 10 | 6 | re | 7 | 5 | 6 | li | 6 |
| 16 | 6 | - | 2 | 7 | = | 9 | 7 | 6 | re | 13 |
| 17 | 13 | 6 | 7 | 6 | re | 4 | 2 | 6 | li | 20 |
| 18 | 20 | - | 9 | 7 | = | 6 | 4 | 6 | re | 7 |
| 19 | 7 | 3 | 4 | 6 | re | 1 | 9 | 6 | li | 14 |
| 20 | 14 | - | 8 | 7 | = | 3 | 1 | 6 | re | 1 |

FIG. 12

| | Spule | La | N | Polzahn | Wdg. | re/li | N | Le | |
|---|---|---|---|---|---|---|---|---|---|
| A | 1a | 1 | - | 8 | 14 | li | - | 8 | a |
| | 2a | 8 | - | 10 | 13 | re | - | 15 | |
| | 3a | 15 | - | 5 | 14 | li | - | 2 | |
| | 4a | 2 | - | 7 | 13 | re | - | 9 | |
| | 5a | 9 | - | 2 | 14 | li | - | 16 | |
| | 6a | 16 | - | 4 | 13 | re | - | 3 | |
| | 7a | 3 | - | 9 | 14 | li | - | 10 | |
| | 8a | 10 | - | 1 | 13 | re | - | 17 | |
| | 9a | 17 | - | 6 | 14 | li | - | 4 | |
| | 10a | 4 | - | 8 | 13 | re | - | 11 | |
| | 11a | 11 | - | 3 | 14 | li | - | 18 | |
| | 12a | 18 | - | 5 | 13 | re | - | 5 | |
| | 13a | 5 | - | 10 | 14 | li | - | 12 | |
| | 14a | 12 | - | 2 | 13 | re | - | 19 | |
| | 15a | 19 | - | 7 | 14 | li | - | 6 | |
| | 16a | 6 | - | 9 | 13 | re | - | 13 | |
| | 17a | 13 | - | 4 | 14 | li | - | 20 | |
| | 18a | 20 | - | 6 | 13 | re | - | 7 | |
| | 19a | 7 | - | 1 | 14 | li | - | 14 | |
| | 20a | 14 | - | 3 | 13 | re | - | 1 | |
| B | 1b | 1 | - | 3 | 14 | re | - | 8 | b |
| | 2b | 8 | 5 | 5 | 12 | li | 7 | 15 | |
| | 3b | 15 | - | 10 | 14 | re | - | 2 | |
| | 4b | 2 | 2 | 2 | 12 | li | 4 | 9 | |
| | 5b | 9 | - | 7 | 14 | re | - | 16 | |
| | 6b | 16 | 9 | 9 | 12 | li | 1 | 3 | |
| | 7b | 3 | - | 4 | 14 | re | - | 10 | |
| | 8b | 10 | 6 | 6 | 12 | li | 8 | 17 | |
| | 9b | 17 | - | 1 | 14 | re | - | 4 | |
| | 10b | 4 | 3 | 3 | 12 | li | 5 | 11 | |
| | 11b | 11 | - | 8 | 14 | re | - | 18 | |
| | 12b | 18 | 10 | 10 | 12 | li | 2 | 5 | |
| | 13b | 5 | - | 5 | 14 | re | - | 12 | |
| | 14b | 12 | 7 | 7 | 12 | li | 9 | 19 | |
| | 15b | 19 | - | 2 | 14 | re | - | 6 | |
| | 16b | 6 | 4 | 4 | 12 | li | 6 | 13 | |
| | 17b | 13 | - | 9 | 14 | re | - | 20 | |
| | 18b | 20 | 1 | 1 | 12 | li | 3 | 7 | |
| | 19b | 7 | - | 6 | 14 | re | - | 14 | |
| | 20b | 14 | 8 | 8 | 12 | li | 10 | 1 | |

| Spule | La | N | Z | Wdg. | re/li | N | Z | Wdg. | re/li | Le | |
|---|---|---|---|---|---|---|---|---|---|---|---|
| 1a | 1 | 10 | 8 | 12 | re | 5 | - | - | - | 8 | }a |
| 2a | 8 | 3 | - | - | - | 2 | 10 | 12 | li | 15 | |
| 3a | 15 | 7 | 5 | 12 | re | 2 | - | - | - | 2 | |
| 4a | 2 | 10 | - | - | - | 9 | 7 | 12 | li | 9 | |
| 5a | 9 | 4 | 2 | 12 | re | 9 | - | - | - | 16 | |

METHOD FOR PRODUCING THE ROTOR WINDING OF AN ELECTRICAL MACHINE, AND AN ELECTRICAL MACHINE WITH A ROTOR WINDING WHICH IS PRODUCED IN ACCORDANCE WITH THIS METHOD

This application is a National Stage Application of PCT/EP2008/065857, filed 19 Nov. 2008, which claims benefit of Ser. No. 10 2008 000 377.8, filed 22 Feb. 2008 in Germany and which applications are incorporated herein by reference. To the extent appropriate, a claim of priority is made to each of the above disclosed applications.

The invention relates to a method for producing the rotor winding of an electrical machine as well as to an electrical machine having a rotor winding produced in accordance with this method.

BACKGROUND

It is known from the German patent publication DE 10 2004 062 813 A1 how to select the number of the slots and pole teeth, which alternate on the circumference of a commutator rotor, such that it deviates from the number of exciter poles in the stator. The number of the so-called individual tooth coils is equal to the number of commutator laminations but twice as high as the number of pole teeth and slots. The coils, which are wound on the pole teeth in an evenly distributed manner, are thereby contacted on the connection lugs of the laminations with a predefined lamination interstice length. Starting from the first coil, all further coils, which are continuously wound in succession, are wound onto in each case that pole tooth with the lowest angular error in relation to a pole division.

In the exemplary embodiments depicted and described in this publication, a problem arises by the winding wire, which often in alternating succession contacts the coils to the commutator laminations, being on the one hand directly guided out of a slot to the connection lug of a lamination and on the other hand having to be guided out of the slot over a large circumferential area to the connection lug. As the coils continue to be continuously wound, said winding wire being guided across a circumferential area then slips in the direction of the laminations onto the winding wires being directly guided to the slots and thereby impedes further contacts onto the connection lugs of the laminations.

In the exemplary embodiments according to FIGS. 8 and 10 of this publication, the connecting wires on the connection lugs of the laminations are partially hooked in such a manner that only an acute angle is formed between the wire leading to the lamination and the one leading away from said lamination. This has the disadvantage of enabling the thus formed wire eyelet on the connection lug to resiliently expand. Because when contacting the winding wire on the connection lug the insulating varnish of said winding wire is melted in the region of the eyelet by so-called hot staking, the danger exists of short circuits occurring to the winding wire eyelets of adjacent connection lugs.

The present inventive solution strives to improve the wire guiding on the connection lugs of the laminations in order to avoid contacting problems as well as to prevent a critical, resilient expansion of the eyelets.

SUMMARY

The method for producing the rotor winding of an electrical machine with the distinguishing features of claim 1 has the advantage of a resilient expansion of the eyelets of the winding wire on the connection lugs of the laminations being greatly reduced by at least one pole tooth being disposed between the winding wire being fed to and guided away from a connection lug and thereby ensuring a sufficient wrap of said connection lug. A further advantage is that in the case of these coils the winding wire cannot slide down between the coil and the connection lug to the commutator when the coils continue to be continuously wound. This results from the fact that at most two pole teeth are situated between the winding wire being fed and guided away from said connection lug, and consequently the winding wire does not extend over a large circumference.

An improved and uniform guidance of the winding wire on the commutator side of the rotor thus occurs as a result of the winding wire being led from the coil to the lamination, respectively from the lamination to the coil, in each case between two additional pole teeth situated closer to the lamination for at least a portion of coils, which are continuously wound in succession. Care should thereby be taken to ensure that two pole teeth lie between the respective lamination and the point where the winding wire is fed through. As an alternative thereto, it can be advantageous in armature embodiments, wherein sufficient room is available between the commutator and the pole teeth of the armature, if for preferably a first portion of the coils, which are continuously wound in succession, the winding wire is led from the coil to the lamination as well as from the lamination to the next coil across a supporting ring disposed on the rotor shaft. In so doing, the coils are offset to the lamination in each case by at least 90 °.

In order to reduce the torque ripple and improve the commutation, the inductance in the pole teeth is reduced in an efficient manner as a result of at least the coils, which are provided with an angular error in relation to the pole division, being wound so as to be distributed onto two pole teeth situated across from each other. In addition, the force components at the pole teeth situated opposite to each other, which are caused by supplying current to the coils, are thereby equally large and consequently in an advantageous manner cancel each other out. All coils are thereby expediently divided and are wound in each case onto two pole teeth situated opposite to each other. The rotor winding can thereby be particularly easily produced if the divided coils are in each case continuously wound in succession as coil halves connected in series. Provision is made alternatively thereto for the divided coils if necessary to be connected in each case as coil halves in parallel to their common initial and end lamination. It is advantageous in achieving a symmetric coil configuration for the coils with angular error and the coils without angular error to be continuously wound in succession in uniform sequence. In a modification to the invention, it can be advantageous for achieving a favorable torque ripple or a uniform distribution of weight across the rotor circumference if the coil halves are in each case wound with different numbers of windings at least for a portion of the coils divided up on pole teeth situated opposite each other

BRIEF DESCRIPTION OF THE DRAWINGS

The invention is by way of example explained below in detail using the Figures. The following are shown:

FIG. 6 shows the winding table for a second exemplary embodiment having 10 divided coils, FIG. 7 shows in schematic depiction the production of 4 coils of the rotor winding according to a first section of the winding table pursuant to FIG. 6.

FIG. 8 shows as a further exemplary embodiment the first section of a winding table having a changed direction of the windings with respect to the table pursuant to FIG. 6.

FIG. 9 shows in schematic depiction the production of 4 coils of the rotor winding according to the section of the winding table pursuant to FIG. 8.

FIG. 10 shows the winding table for a fourth exemplary embodiment having 20 divided coils and FIG. 11 shows in schematic depiction the production of the rotor winding according to a first section of the winding table pursuant to FIG. 10.

FIG. 12 shows the winding table for a fifth exemplary embodiment of twenty divided coils.

DETAILED DESCRIPTION

Figure 1:
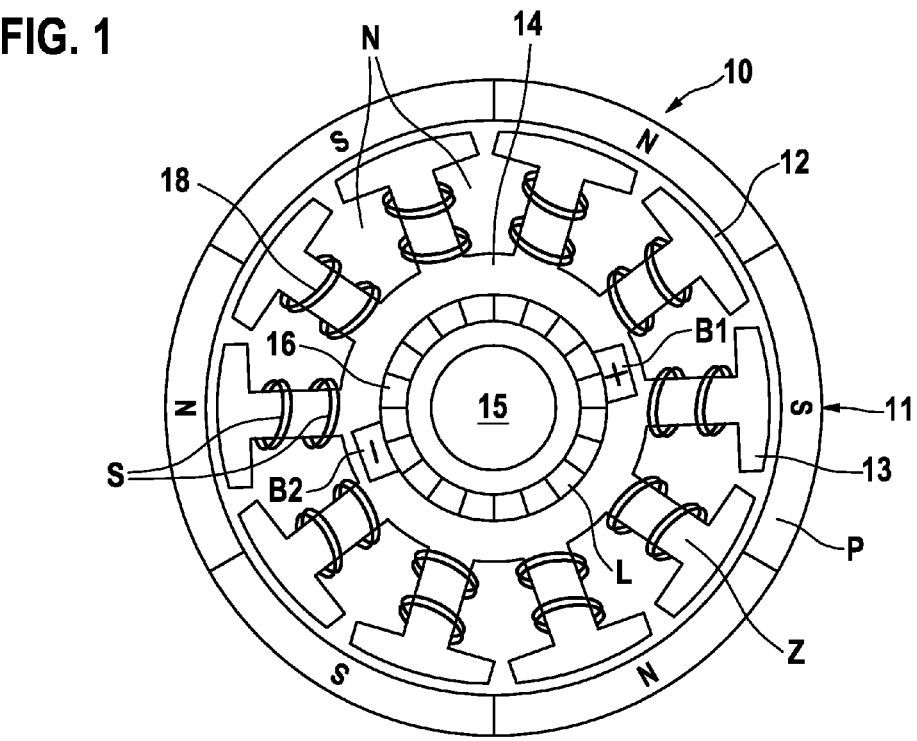
FIG. 1 a schematic depiction of the electrical machine according to the invention in a front view, FIG. 2 the developed view of the machine from FIG. 1 in schematic depiction having a first individual tooth coil.

A permanent-magnetically excited six-pole direct current motor is schematically depicted in a front view in FIG. 1 as a first exemplary embodiment and is denoted with the numeral 10. Machines of this type are preferably used for actuating drives, radiator fans and the like in motor vehicles and have to reliably operate under heavy loads if possible for the entire service life of the motor vehicle. Their construction must therefore be as robust as possible. The electrical machine 10 has a six-pole stator 11, which interacts with a commutator rotor 13, subsequently referred to as rotor, via a working air gap 12. The rotor 13 consists of a lamination stack 14, which is attached to a rotor shaft 15 that is supported on both sides. Ten uniformly spaced pole teeth Z are disposed on the circumference of the lamination stack 14. Slots N for receiving in total twenty coils S of a rotor winding 18 are configured between said pole teeth Z. The coils S are thereby produced by automatic coiling machines as individual tooth coils in pairs around a respective pole tooth Z. The coils S are thereby connected in a special manner to a commutator 16 fitted on the rotor shaft 15 at the front face side of the lamination stack 14. The commutator 16 has twenty laminations L disposed uniformly spaced across the circumference, which interact with two fixed carbon brushes B1 and B2. The carbon brushes B1 and B2 are offset to each other by 180 ° and are supplied with direct current for operating the electrical machine. The ten pole teeth Z of the rotor 13 thereby interact with three exciter pole pairs of the stator 11. In order to achieve the least possible torque ripple of the electrical machine, the number of pole teeth deviates from the number of exciter poles P.

Figure 2:
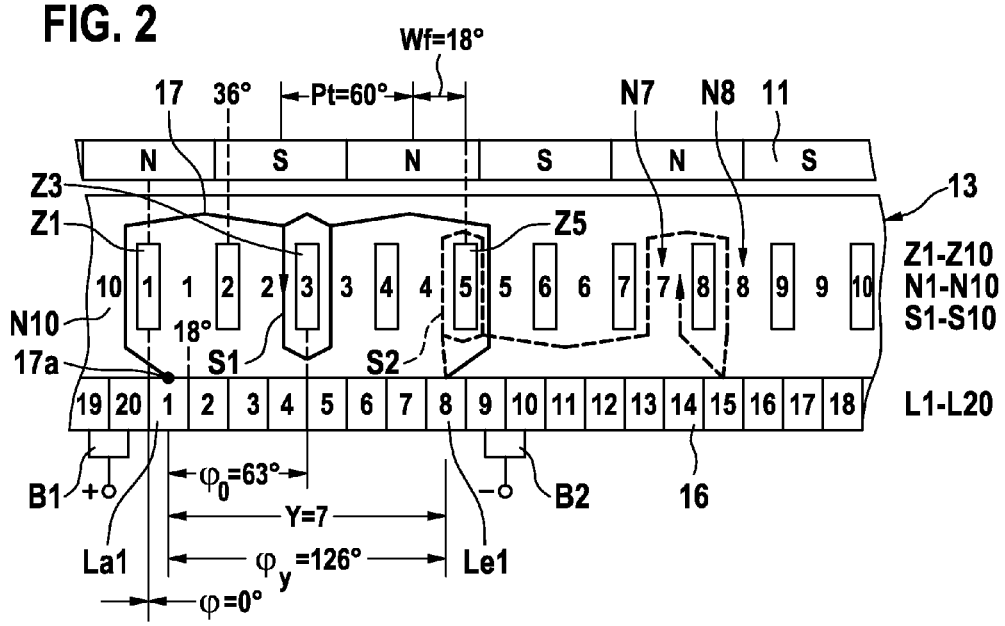

FIG. 2 shows in schematic depiction a developed view of the direct current motor 10 from FIG. 1, with which the winding method for producing and disposing the coils S on the pole teeth Z of the rotor 13 is explained below in detail. The six-pole stator 11, the ten pole teeth Z1 to Z10, the first two individual tooth coils S1 and S2 as well as the twenty laminations L1 to L20 of the commutator 16 can be recognized there. The disposal of the first coil S1 can be freely selected and in this instance is associated with the third pole tooth Z3. Furthermore, the first pole tooth Z1 is hereby associated with the center of a north pole N of the stator 11. This association can also be freely selected. In addition, the likewise freely selectable association of the commutator laminations L with the pole teeth Z is selected here, such that the first pole tooth Z1 lies exactly at the height of the lamination slit between the laminations L1 and L20 of the commutator 16. In accordance with FIG. 2, this position is henceforth to have the angular position of v=0°. It therefore follows that the adjacent pole tooth Z2 lies at the position of 36° and that the next lamination slit is located at the position of 18°. It is, furthermore, established that all of the coils S are contacted in each case at their beginning on an initial lamination La and at their end on an end lamination Le. According to FIG. 2, the lamination L1 for the first coil S1 forms the freely selectable initial lamination La1. As a result of the disposal of the position of the lamination L1 selected here, an offset angle $v_0$ of 63° consequently occurs between the initial lamination La1 of the coil S1 and the pole tooth Z3 provided for this coil. The optimal position of the coil S1 is located in FIG. 2 centered below a pole of the stator 11. This position has an angular error Wf=0°.

In order to be able to continuously wind the individual tooth coils S in the manner of a spiral winding onto the pole teeth Z, a lamination interstice length Y is defined for all of the coils S, which ensures that the end of each coil is contacted to a free lamination L. A lamination interstice length Y of seven laminations is provided in FIG. 2, i.e. Y=7.

As already depicted and described in detail in the aforementioned German patent publication DE 10 2004 062 813 A1, the initial lamination La and the end lamination Le can initially be consecutively ascertained for all of the coils. Subsequently the angular error Wf in relation to the pole division of the stator 11 is ascertained for each additional coil of the rotor, which succeeds coil S1, in a first round for each pole tooth Z using the following formula:

$$Wf(j)=\cos [2B*p/z*(j-Lai/M)] \qquad (1)$$

From the angular error of the second coil S2 ascertained in this manner for each pole tooth Z, that pole tooth, on which the coil S2 has the smallest angular error Wf, is now ascertained in an additional step. The smallest angular error Wf= 18°, respectively the largest angular error-maximum cosine value=0.951, is ascertained in this manner for the coil S2 on the pole tooth Z5. The same angular error also occurs on the pole teeth Z8, Z10, and Z3, which can be utilized for an optimal coil connection.

In this manner, the initial and end laminations La and Le as well as the respective optimal pole tooth Z are ascertained for all of the coils S. In the aforementioned patent publication the winding table required for an automatic coiling machine is created, wherein the winding wire is led in each case directly from the initial lamination La to the coil S, respectively from the coil S to the end lamination Le. In the case of larger numbers of coils, problems occur, however, thereby in guiding the wire between the commutator 16 and the coils S so that it is required to arrange the coil connections to the laminations 16 in proper order.

Figure 3A:
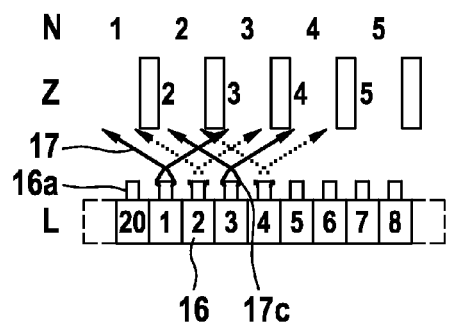
FIGS. 3a to 3f show schematically different forms of connection of the winding wire to a plurality of adjacent commutator laminations.
Figure 3B:
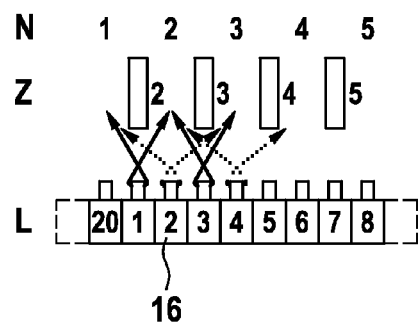
Figure 3C:
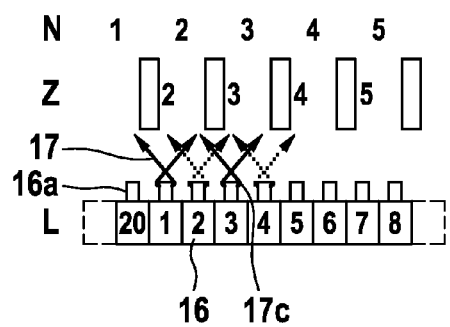
Figure 3D:
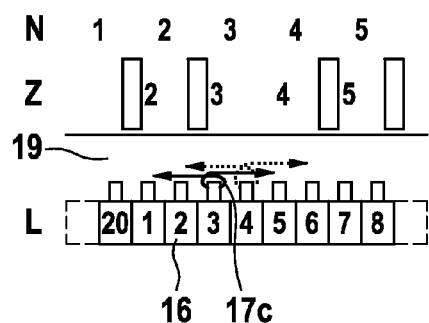
Figure 3E:
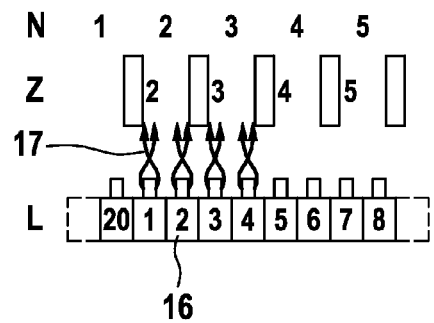
Figure 3F:
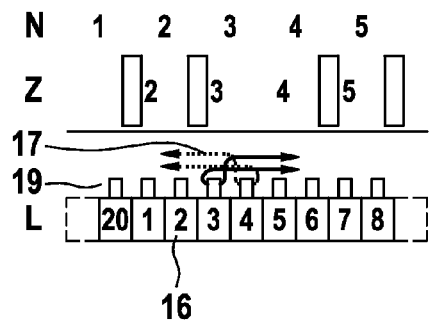

In FIGS. 3a to 3f different options for contacting are schematically depicted. The winding wire 17 is thereby in each case led around a connection lug 16a of the laminations L. In so doing, such solutions are designated below as "hooking", wherein the winding wire is led in each case directly from the connection lug 16a of a lamination L to a slot N. This is the case for the embodiments according to FIGS. 3a, 3b, 3c and 3e. Connections referred to below as "hooking around" are those, in which the winding wire 17 is led from a connection lug 16a of the commutator 16 around the rotor shaft to the slot N while resting on a supporting ring 19 made of insulating material, which is disposed between the commutator 16 and the lamination stack 14. This is the case for embodiments according to FIGS. 3d and 3f. Because during so-called hot staking for contacting the laminations L the connection lug 16 is bent to form a hook towards the lamination using a punch electrode and is melted to the winding wire 17, the insulating varnish melts off in the region of the eyelets 17c on the winding wire 17 surrounding the connection lugs 16a. As a result it is very important that the eyelets 17c are led around said connection lugs 16a as tightly as possible and that they resiliently expand as little as possible after their being hooked on, respectively hooked around, said connection lugs 16a. This must occur so that in the case of connection lugs 16 lying close to one another, adjacent laminations L are not short-circuited via the eyelets 17c. This is the case in the embodiments according to FIGS. 3a, 3b, 3c and 3d, in which the winding wire is fed from one side to the connection lug and is again guided away to the other side. When hooking according to FIG. 3a, two pole teeth Z lie between the winding wire 17 fed to the lamination L and guided away from said lamination L. In the embodiment according to FIG. 3b, one pole tooth, respectively two pole teeth Z, alternately lie(s) between the winding wire 17 fed to the lamination L and guided away from said lamination L at the adjacent lamination connections; and in the embodiment according to FIG. 3c one pole tooth Z lies in each case between the winding wire 17 fed to the lamination L and guided away from said lamination L. A narrow eyelet 17c with little resilient expansion also occurs when hooking around the connection lugs 16a according to FIG. 3d, because the winding wire 17 is also in this case fed from the one side to the connection lug 16a and guided away to the other side. The problematic embodiments according to FIGS. 3e and 3f are in contrast to be avoided. When hooking according to FIG. 3e, only a small acute angle is formed in each case between the winding wire 17 fed to the connection lug 16a and that guided away form said connection lug 16a because the feeding and guiding away of said winding wire 17 go out practically vertically from the lamination L to one and the same slot. With increasing wire gauge, said winding wire 17 will in this case resiliently expand in the region of the eyelet 17c with the danger of lamination connections. The danger of an increasingly resiliently sprung eyelet 17c also occurs in an embodiment according to FIG. 3f, wherein when employing a hooking around connection said winding wire 17 is fed and guided away between the connection lugs 16a and the coils S in a manner such that it is led to one and the same side across the supporting ring 17 practically parallel to the respective slot.

In order to be able to optimally utilize the space between the commutator 16 and the lamination stack 14 of the rotor 13 for the lug connections of the coils S to the laminations L, particularly in the case of a large number of coils, it can be useful to contact the first continuously wound portion of the coils S using a hooking around connection to the laminations L according to FIG. 3d; thus enabling the coils to be subsequently contacted by a hooking connection to the laminations when the latter portion of said coils is continuously wound. In so doing, one of the solutions according to FIG. 3a, 3b, or 3c is used for the hooking connection. The required winding tables for the following exemplary embodiments are consequently created such that the winding wire 17, which is contacted to a connection lug 16a of a lamination L, is fed from the one side of the lamination and guided away from the other side at least in the case of a last-wound section of the coils S and such that at least one pole tooth Z, but at most two pole teeth Z, are situated between the slot N from which the winding wire 17 of the lamination L is fed and the slot at which said winding wire is guided away from the lamination L. In order to achieve this, the winding wire 17 must be led from the coil S to the lamination L, respectively from the lamination L to the coil S, in each case between two more pole teeth, which lie closer to the lamination L, at least for a portion of the coils S, which are continuously wound in succession. In so doing, at most two pole teeth Z may lie between the lamination L and the feed through of the winding wire.

In the first exemplary embodiment according to FIGS. 1 and 2, a winding table for a six-pole direct current motor with the following specifications is henceforth created according to the previously described parameters:

| | |
|---|---|
| Number of pole pairs | p = 3 |
| Number of pole teeth | Z = 10 |
| Number of laminations | L = 20 |
| Number of coils | S = 20 |
| Lamination interstice length | Y = 7 |
| Number of windings | Wz = 14, respectively 15 |
| Offset angle | (Pole tooth 1 to lamination 1) v = 0° |

An undepicted automatic coiling machine now executes line-by-line the winding table that has been created, the coils S1 to S20 being continuously wound in succession and in each case being contacted to the laminations L of the commutator 16, which are associated with them. In FIGS. 5a to 5e, the production of the coils according to the winding table from FIG. 4 pursuant to the table sections a to f is schematically depicted in a developed view of the rotor and described below:

According to section a, the winding wire 17 is initially contacted with its beginning 17a on the lamination L1. From there it is fed to the slot 10 and through it to the backside of the rotor and from there to the pole tooth Z3. The coil S1 is now wound on the pole tooth Z3 with 14 windings to the left— indicated by the arrow. The coil end is now guided across the backside of the rotor to the slot N5. From there said winding wire 17 is now fed through the slot 5 to the commutator 16 and is contacted there to the lamination L8. From there the coil S2 is wound on the pole tooth Z5 with 15 windings to the right, and the coil end is then fed through the slot N7 to the backside of the rotor. From there said winding wire 17 now travels through the slot N8 to said commutator side and is contacted here to the lamination 15. From there said winding wire 17 is now fed through the slot N7 to said rotor backside and thereafter to the pole tooth Z10. There the coil S3 is wound with 14 windings to the left, and the coil end is thereafter fed across said rotor backside, through the slot N2 to said commutator side and is contacted here to the lamination L2. From there the coil S4 is now wound on the pole tooth Z2 with 15 windings to the right, and the coil end is thereafter fed through the slot N4 to said rotor backside. From there said winding wire 17 now travels through the slot N5 to said commutator side and is contacted here to the lamination L9. From said lamination L9 the coil wire is carried over onto the developed view of the rotor in FIG. 5b by means of the indicated arrow. In so doing, said winding wire is in each case with its sections depicted with dashed lines carried over from the left side of the developed view of the rotor to the right side.

There the winding wire 17 is guided from the lamination L9 through the slot N4 to the rotor backside and thereafter to the pole tooth Z7. The coil S5 is wound there with 14 windings to the left, and the coil end is then guided across said rotor backside through the slot N9 to the commutator side and is contacted here to the lamination L16. From there the coil S6 is now wound onto the pole tooth Z9 with 15 windings to the right, and the coil end is thereafter fed through the slot N1 to said rotor backside. From there said winding wire 17 now travels through the slot N2 to said commutator side and is contacted here to the lamination L3. From there said winding wire now is fed through the slot N1 to said rotor backside and thereafter to the pole tooth Z4. The coil S7 is wound there with 14 windings to the left, and the coil end is led thereafter across said rotor backside through the slot N6 to said commutator side and is contacted here to the lamination L10. From there the coil S8 is wound on the pole tooth Z6 with 15 windings to the right, and the coil end is thereafter fed through the slot N8 to said rotor backside. From there said winding wire 17 now travels through the slot N9 to said commutator side and is contacted here to the lamination L17. From said lamination L17 the coil wire is carried over by the indicated arrow onto the developed view of the rotor in FIG. 5c.

Figures 4, 5A:
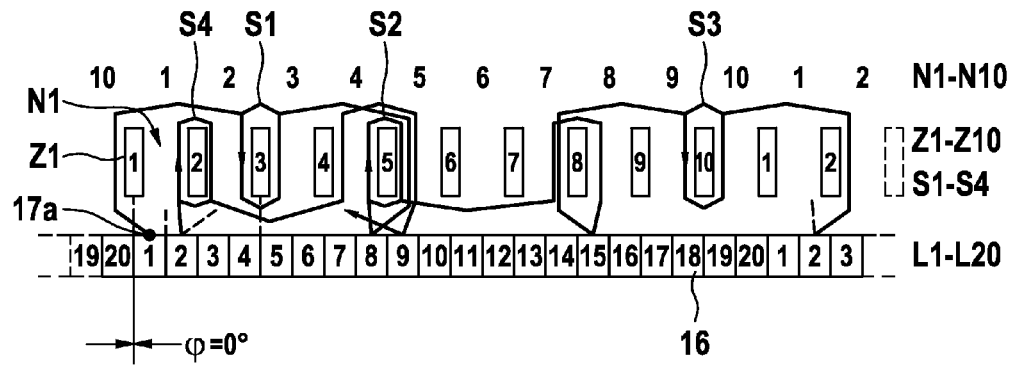
FIG. 4 shows in a first exemplary embodiment the winding table created pursuant to the FIGS. 3a to 3f and FIGS. 5a to 5e show in schematic depiction the production of the rotor winding according to the winding table pursuant to FIG. 3 in five sections.
Figure 5B:
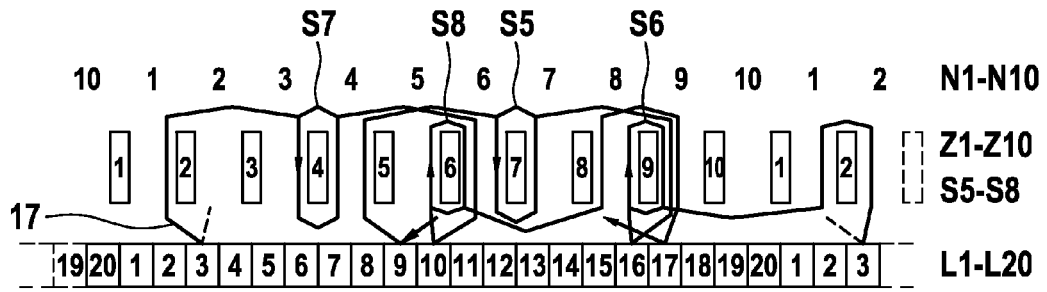
Figure 5C:
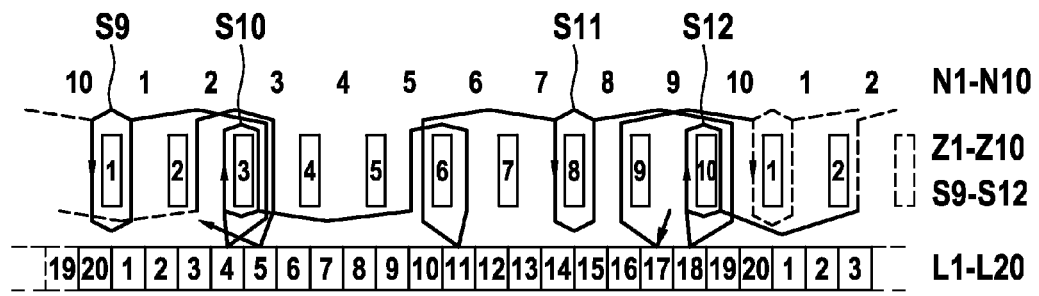

In the same manner, the coils S9 to S12 are now continuously wound in succession pursuant to section c of the winding table according to FIG. 4, as is depicted in the developed view of the rotor according to FIG. 5c.

Figure 5D:
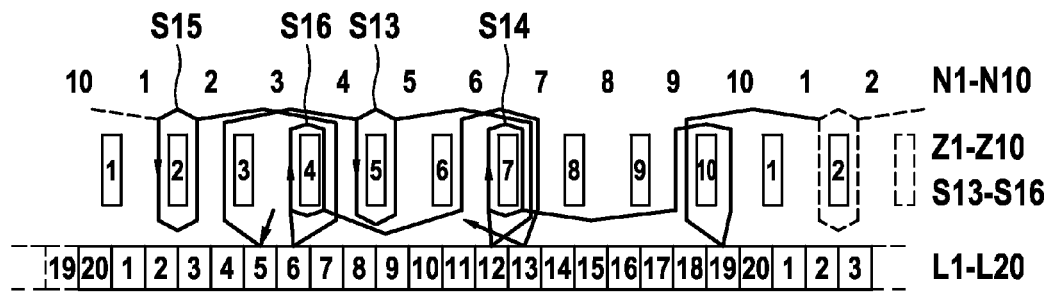
Figure 5E:
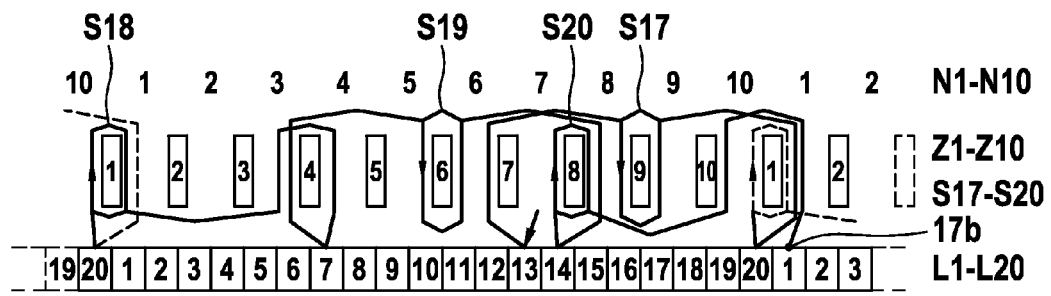

The coils S13 to S16 are also produced in the same manner according to the developed view of the rotor pursuant to FIG. 5d in accordance with section d of the winding table pursuant to FIG. 4 as well as the coils S17 to S20 according to the developed view of the rotor pursuant to FIG. 5e in accordance with section e of the winding table from FIG. 4. After all 20 coils have now been continuously wound in succession, the end 17b of the winding wire is finally again contacted on the lamination L1.

In this exemplary embodiment, all of the coils S are hooked on the laminations L. According to the hooking procedure pursuant to FIG. 3c, the feeding and guiding away of the winding wire at both sides of the lamination is in each case defined in such a way that in all cases a pole tooth Z lies respectively between the feed of said winding wire and the guiding away of said wire. In order to also achieve this in the instances where the coils S lie farther away from their lamination connections, the coil ends are fed through the slots N that lie closer to the respective lamination connections. These feed throughs of said winding wire have a spacing of at most two pole teeth in order to avoid magnetic asymmetries.

In a second exemplary embodiment of the invention, all coils provided with an angular error w=f>0 ° in relation to the pole division are now disposed as to be distributed onto two pole teeth Z opposite one another in order to reduce the torque ripple and to avoid radial magnetic forces occurring on one side of the periphery of the rotor. In the first exemplary embodiment, this includes every other coil. According to the calculations of the angular error for all of the coils, it is known from the aforementioned patent publication that equally sized angular errors, respectively no angular errors, occur for each coil at a plurality of positions that are opposite to one another. On the basis of these known calculations, a winding table pursuant to FIG. 6 for an electrical machine 10 according to FIG. 1 is created with the following specifications as a modification to the first exemplary embodiment:

| | |
|---|---|
| Number of pole pairs | p = 3 |
| Number of pole teeth | Z = 10 |
| Number of laminations | L = 20 |
| Number of coils | S = 20 |
| Lamination interstice length | Y = 7 |
| Number of windings | Wz = 10, respectively 7 |
| Offset angle | v = 0° |

An automatic coiling machine now executes line-by-line the winding table according to FIG. 6, wherein the coils S1 to S20 are continuously wound in succession and in each case contacted to the laminations L of the commutator 16, which are associated with them. In FIG. 7, the production of the coils S1 to S4 according to section a of the winding table from FIG. 6 is schematically depicted in a developed view of the rotor and described below. The coils S2 and S4 are thereby divided up into two halves S2a and S2b as well as S4a and S4b.

According to section a), the winding wire 17 is initially contacted with its beginning 17a to the lamination L1. From there said winding wire 17 is now fed through the slot N10 to the backside of the rotor and thereafter to the pole tooth Z3. There the coil S1 is wound with 10 windings to the left, and the coil end is then fed through the slot N5 to the commutator side and is contacted here to the lamination L8. From there the first coil half S2a of the second coil is wound on the pole tooth Z5 with 7 windings to the right, and said winding wire is thereafter guided to pole tooth 8. The second coil half S2b is now wound there with 8 windings to the right, and the coil end is thereafter contacted to the lamination L15. From there said winding wire is fed through the slot N7 to the backside of the rotor and then to the pole tooth Z10. The coil S3 is wound there with 10 windings to the left, and the coil end is thereafter fed through the slot N2 to said commutator side and is contacted here to the lamination L2. From there the first half S4a of the fourth coil is now wound on the pole tooth Z2 with 7 windings to the right, and said winding wire is guided thereafter to the pole tooth Z5. The second coil half S4b is wound there with 7 windings to the right, and the coil end is then contacted to the lamination L9. In the same manner, the subsequent lines of the winding table according to FIG. 6 are now executed by the automatic coiling machine. In so doing, the undivided coils and the divided coils are continuously wound in an alternating sucession. With this winding table, the result for the second exemplary embodiment is that according to FIG. 7 the divided coils S2, S4, S6 are continuously wound in succession . . . in each case as coil halves S2a, S2b, S4a, S4b, S6a and S6b . . . in a series connection. In addition, the coils are also in this instance hooked on the laminations L pursuant to the embodiment according to FIG. 3c in the same manner as in the case of the first exemplary embodiment.

In a third exemplary embodiment, a first section a of a winding table is depicted pursuant to FIG. 8, in which merely the direction of winding of the coils S is changed with regard to the second exemplary embodiment. In so doing, a changed wire guiding between the coils S and the laminations L also results.

For that reason, FIG. 9 shows that the winding wire 17 is also contacted in this instance with its beginning 17a to lamination L1. From there the coil S1 is wound onto the pole tooth Z3 with 10 windings to the right, and the coil end is then contacted to the lamination L8. From there said winding wire is now led to the pole tooth Z 5. The first coil half S2a is wound there with 7 windings to the left, and said winding wire is then led to the pole tooth Z8. The second coil half S2b is now wound there with 7 windings to the left, and the coil end is contacted to the lamination L15. From there the coil S3 is now wound on the pole tooth Z10 with 10 windings to the right, and the coil end is thereafter contacted to the lamination L2. From there the said winding wire is then led to the pole tooth Z2, and the first half S4a of the fourth coil is wound there with 7 windings to the left. Said winding wire is thereafter led to the tooth S5 and the second winding half S4b is wound with 7 windings to the left. The coil end is thereupon contacted to lamination L9. In the same manner, all remaining coils, respectively coil halves, are now continuously wound in succession by the automatic coiling machine pursuant to the winding table according to FIG. 8. In this embodiment, passages of the coil ends through adjacent slots can be avoided because a direct hooking of the coil connections onto the laminations L pursuant to the embodiment according to FIG. 3a is possible, whereby two pole teeth lie between the points where said winding wire is fed to and guided away from said laminations L.

In a fourth exemplary embodiment, FIG. 10 shows the winding table for an electrical machine 10 from FIG. 1, in which all coils S are henceforth separately wound onto pole teeth that are arranged in each case opposite one another. The coil halves are thereby in each case connected in series with each other. The following specifications pertain to this electrical machine:

| | |
|---|---|
| Number of pole pairs | p = 3 |
| Number of pole teeth | Z = 10 |
| Number of laminations | L = 20 |
| Number of coils | S = 20 |
| Lamination interstice length | Y = 7 |
| Number of windings | Wz = 2 × 6, respectively 7 and 6 |
| Offset angle | v = 12° |

Figure 11:
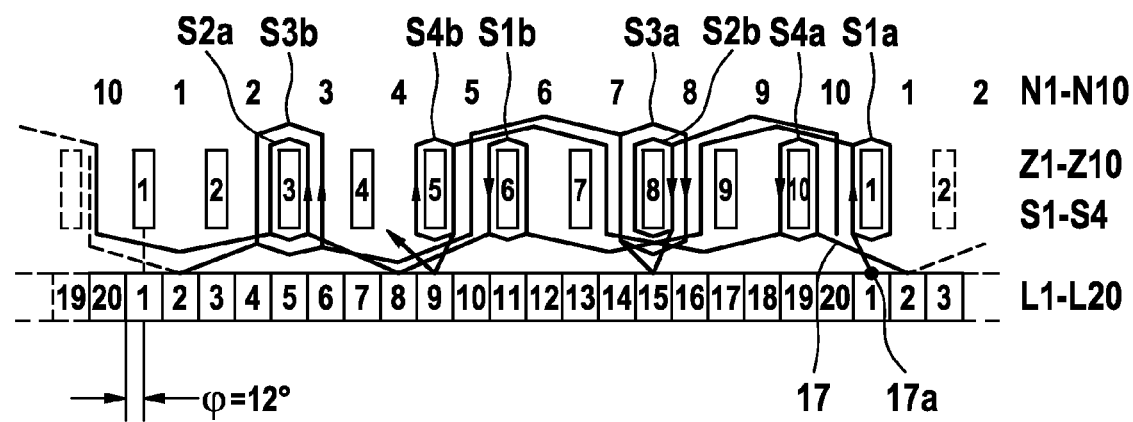

In FIG. 11 the production of the first four coils S1 to S4 pursuant to section a according to the winding table from FIG. 10 with the 8 partial coils S1a, S1b to S4a, S4b is henceforth schematically depicted in a developed view of the rotor and described below.

The winding wire 17 is initially contacted on the lamination L1 with its beginning 17a. From there it is now fed through the slot N10 to the backside of the rotor and the coil half S1a is thereupon wound on the pole tooth Z1 with 6 windings to the right. After that said winding wire is led across the backside of the rotor through the slot N8 to the commutator side and from there to the pole tooth Z6. The second coil half S1b is wound there with 6 windings to the left and the coil end is then contacted to the lamination L8. From there the coil half S2a is wound onto the pole tooth Z3 with 7 windings to the left, and said winding wire is thereafter fed through the slot N10 to said backside of the rotor and then led to the pole tooth Z8. The coil half S2b is wound there with 6 windings to the right and the coil end is thereafter contacted to the lamination L15. From there said winding wire is now fed through the slot N7 to said backside of the rotor, and the coil S3a is now wound onto said pole tooth Z8 with 7 windings to the right. From there said winding wire is now fed through the slot N5 to said commutator side, and the second pole half S3b is wound on said pole tooth Z3 with 6 windings to the left. The coil end is thereafter contacted to the lamination L2. From there the coil half S4a is now wound on the pole tooth Z10 with 7 windings to the left, and said winding wire is then fed through the slot N7 to said backside of the rotor. From there said winding wire travels to the pole tooth Z5. The second coil half S4b is wound there with 6 windings to the right and the coil end is thereafter contacted to the lamination L9.

In the same manner, the following lines of the winding table are henceforth executed with an automatic coiling machine according to FIG. 10; and in so doing the coils S5 to S20, half of which are in each case connected in series, are wound onto pole teeth opposite to one another. In this exemplary embodiment the coil connections on the laminations are implemented using the hooking procedure according to the embodiment pursuant to FIG. 3b, whereby a pole tooth Z in each case lies between the points where the winding wire is fed to and guided away from the laminations L for a portion of the connections and whereby two pole teeth Z in each case lie between said points where said winding wire is fed to and guided away from said laminations L for another portion of said connections.

In a fifth exemplary embodiment, a winding table is henceforth created for an electrical machine 10 according to FIG. 1, whereby all coils are divided into two coil halves a and b and allocated in each case onto pole teeth opposite to one another and wherein the coil halves Sa and Sb are connected in parallel to their common initial and end laminations La and Le in contrast to the previous exemplary embodiment. In order to ensure a reliable, orderly arranged wire guidance between the commutator 16 and the lamination stack 14 of the rotor 13, the first coil halves Sa of the 20 coils S are in each case continuously wound by the automatic coiling machine in a first winding section A and after that the second coil halves Sb are continuously wound in succession in a second winding section B. As a result, the winding wire of the respective coil half can be led to the lamination L as well as from said lamination to the next coil half Sa in each case across a supporting ring 19, which is disposed on the shaft of the rotor, in the first section of the coil halves that are continuously wound in succession.

The following specifications pertain to the fifth exemplary embodiment:

| | |
|---|---|
| Number of pole pairs | p = 3 |
| Number of pole teeth | Z = 10 |
| Number of laminations | L = 20 |
| Number of coils | Sa = 20; Sb = 20 |
| Lamination interstice length | Y = 7 |
| Number of windings | Wz = 14, respectively 13 |
| Offset angle | v = 0° |

Figure 13A:
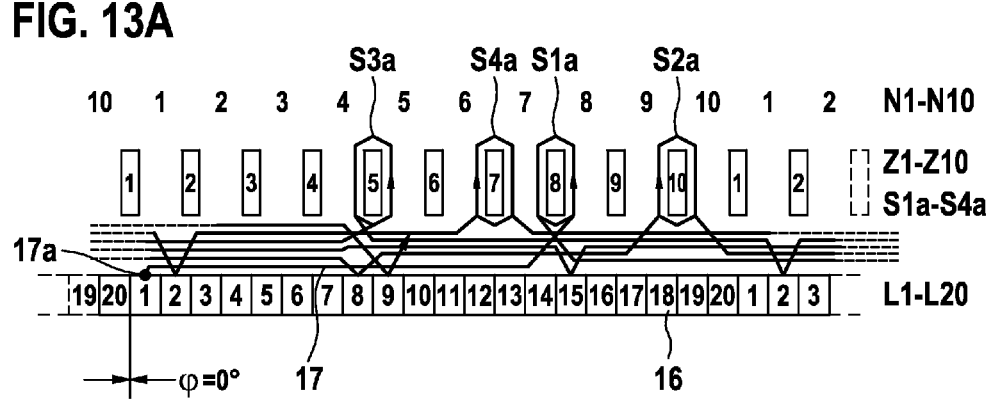
FIG. 13a shows in schematic depiction the production of the first four partial coils according to the first section of the winding table pursuant to FIG. 12

In FIG. 13a the production of the coil halves S1a to S4a according to the winding table from FIG. 12 pursuant to the table section a is schematically depicted in a developed view of the rotor and described below.

The winding wire 17 is initially contacted with its beginning 17a on the lamination L1. Thereafter said winding wire is led to the right to the pole tooth Z8. The first coil half Sa is wound there with 14 windings, and the coil end is in turn led to the right and contacted to the lamination L8. From there said winding wire is now led to the right to the pole tooth Z10. The coil half S2a is wound there with 13 windings to the right, and the coil end is then led to the right to the and contacted to the lamination L15. From there said winding wire is now led to the right to the pole tooth Z5. The coil half S3a is wound there with 14 windings to the left, and the coil end is thereupon led to the right and contacted to the lamination L2. From there said winding wire is in turn led to the right to pole tooth Z7. The coil S4a is wound there with 13 windings to the right, and the coil end is thereupon led to the right and contacted to the lamination L9. From there the automatic coiling machine executes all further lines from the first half of the winding table in FIG. 12 for the production of the remaining first coil halves S5a to S 20a. In FIG. 13a the coil wires are thereby carried over from the right side to the left side of the developed view of the rotor using a dashed line. The contacting of the coil halves Sa on the laminations L results in this case by a hooking around procedure according to FIG. 3d, whereby said winding wire is led between the lamination and the coil in each case across a supporting ring 19, the coils being offset to the lamination in each case by at least 90 ° on the circumference of the rotor.

Figure 13B:
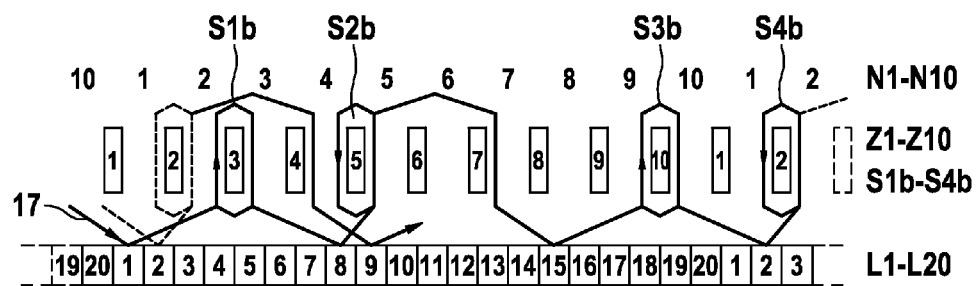
FIG. 13b shows in schematic depiction the production of the four partial coils connected in parallel with said first four partial coils according to a second section of the winding table pursuant to FIG. 12.

In FIG. 13b the production of the second coil halves Sb from the winding table according to FIG. 12 pursuant to the table section b is henceforth schematically depicted in a developed view of the rotor and described below.

After the first coil half 20a of the twentieth coil is wound onto the pole tooth Z3 and the coil end is contacted to lamination L1, the winding wire 17 is now led from lamination L1 to the pole tooth Z3. The coil half S1b is wound there with 14 windings to the right and the coil end is then contacted to the lamination L8. From there said winding wire is now fed through the slot N5 to the backside of the rotor and the coil half S2b is thereupon wound onto the pole tooth Z5 with 12 windings to the left. The coil end is then led across said backside of the rotor through the slot N7 and contacted on the commutator side to the lamination L15. From there the coil half S3b is now wound on the pole tooth Z10 with 14 windings to the right and the coil end is contacted to the lamination L2. From there the winding wire is now fed through the slot N2 to said backside of the rotor, and the coil S4b is thereupon wound on the pole tooth Z2 with 12 windings to the left. The coil end is then led across said backside of the rotor through the slot N4 to said commutator side and is contacted there to the lamination L9. From there all additional second coil halves S5b to S20b are continuously wound in succession on the pole teeth, and in this manner the second half of the winding table according to FIG. 12 is executed by the automatic coiling machine. The contacting of the coil halves Sb to the laminations L occurs in this instance by hooking pursuant to the procedure according to FIG. 3a, whereby two pole teeth Z lie in each case between the points where the winding wire is fed to and guided away from the laminations. By dividing the coil production into two winding sections according to the winding table from FIG. 12, it is ensured that the coil connections made on the laminations L by hooking around in the first section of the winding table do not interfere with the coil connections of the second winding section made by hooking on the laminations L and vice-versa that when making connections the hooking in the second section does not interfere with the hooking around in the first section.

Figures 14, 15:
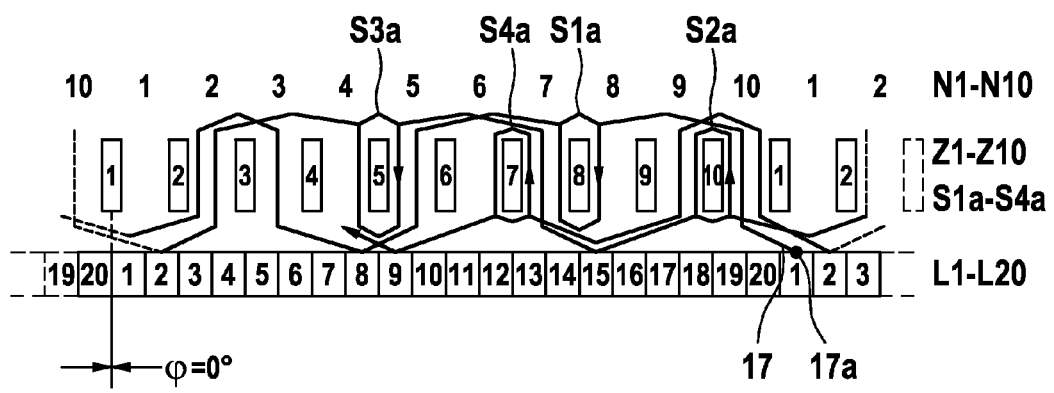
FIG. 14 shows the first section of a winding table for a sixth exemplary embodiment having a changed connection configuration with respect to the winding table pursuant to FIG. 12
FIG. 15 shows in schematic depiction the production of the first section of the rotor winding according to the winding table pursuant to FIG. 14.

In a modification to the previous exemplary embodiment, a winding table, which pursuant to FIG. 14 is partially depicted, is now created in a sixth exemplary embodiment. In said winding table, the direction of winding is changed for the forty coil halves. In addition, the coil connections in the first section of the continuously wound coil halves S1a to S20a on the laminations L are hereby to be implemented not by the hooking around procedure according to FIG. 13a but by the hooking procedure according to FIG. 13b. In order to do this, the coil ends have to be fed to a greater extent through additional slots N when crossing the backside of the rotor, which lie closer to the respective lamination connection. In FIG. 15 the production of the coil halves S1a to S4a of the winding table according to FIG. 14 and pursuant to the table section a is henceforth schematically depicted in a developed view of the rotor and described below.

The winding wire 17 is initially contacted with its beginning 17a on the lamination L1. From there the winding wire is now fed through the slot N10 to the backside of the rotor and is thereafter led onto the pole tooth Z8. The coil S1a is wound there with 12 windings to the right, and the coil end is then fed through the slot N5 to the commutator side and is contacted here to the lamination L8. From there said winding wire is fed through the slot N3 to said backside of the rotor and thereafter through the slot N2 to the pole tooth Z10. The coil S2a is wound there with 12 windings to the left, and the coil end is then contacted to the lamination L15. From there said winding wire is now fed through the slot N7 to said backside of the rotor and is thereafter led to the pole tooth Z5. The coil half S3a is wound there with 12 windings to the right, and the coil end is led across said backside of the rotor and fed through the slot N2 to said commutator side and is contacted here to the lamination L2. From there said winding wire is now fed through the slot N10 to said backside of the rotor and from there through the slot N9 to said commutator side. From there the coil half S4 a is wound on the pole tooth Z7 with 12 windings to the left and the coil end is thereafter contacted to the lamination L9. All additional coil halves S5a to S20a and S1b to S20b are subsequently produced in the same manner. The coil connection on the laminations L takes place here as a modification to FIG. 13a by hooking said winding wire on the laminations L instead of by hooking around on the same.

The invention is not limited to the exemplary embodiments that are depicted because a plurality of combinations for implementing the rotor winding of an electrical machine 10 according to FIG. 1 result within the scope of the specifications for the number of pole pairs, the number of teeth and the lamination interstice length. Furthermore, it is possible in the case of winding embodiments without a division of the coils for the coils S, which are continuously wound in succession, to be divided into two winding sections, which are as the case may be of different size. In so doing, the coils of the first winding section are to be contacted on the laminations L using the hooking around procedure. It is advantageous if need be for a trouble-free contacting of the coils S to the laminations L if coils with an angular error Wf and coils without an angular error Wf are continuously wound in uniform succession. Because this would require that the winding wire be led to the laminations L, respectively from the laminations, through a slot situated closer to said laminations L for a portion of the coils S, it is useful if need be for achieving a better commutation and less torque ripple if the coil halves Sa and Sb are wound with different numbers of windings at least for a portion of the coils S, which are divided up on the pole teeth situated opposite to each other. This is the case for the winding tables according to FIGS. 10 and 12. The offset angle v between the pole tooth 1 and the slit of the lamination L1 is preferably selected such that the lamination is if possible not in front of a slot N, through which the winding wire is led from the lamination L1 to the coil S1.

Further alternatives to the inventive production of the rotor coils S of electrical machines occur as a result of the coil halves of the divided coils being connected in parallel to each other in a first continuously wound coil section and as a result of the coil halves of the remaining divided coils being connected in series to each other in a second coil section. A further alternative in the case of the divided coils would be if the first coil halves Sa are continuously wound in a first winding section and the second coil halves Sb, which in each case are once more divided into two partial coils Sb1 and Sb2 connected to each other in series, are continuously wound in the second winding section.

The invention claimed is:

1. A method for producing a rotor winding of a direct current motor having at least four exciter poles in the stator and having a commutator rotor, the commutator rotor including a number of slots and pole teeth on its circumference, the number of pole teeth deviating from the number of exciter poles, and having a number of individual tooth coils and an equal number of commutator laminations, the number of commutator laminations being twice the number of pole teeth, the method comprising:
    continuously winding the individual tooth coils onto the pole teeth so as to be evenly distributed, wherein the continuously wound coils are wound starting from a first coil onto in each case that pole tooth with the lowest electrical angular error in relation to a pole division;
    causing the individual tooth coils to contact connection lugs of the commutator laminations with a predetermined lamination interstice length, the predetermined lamination interstice length ensuring that an end of each coil is contacted to a free lamination;
    wherein continuously winding the individual tooth coils comprises feeding a winding wire from one side of the commutator lamination and guiding the winding wire away from the other side, wherein at least one pole tooth and at most two pole teeth are situated between the slot from which the winding wire of the lamination is fed and the slot at which said winding wire is guided away from the commutator lamination; wherein the individual tooth coils are continuously wound in succession, the winding wire is led from the coil to the lamination, and then from the lamination to the coil, in each case between two pole teeth of the number of pole teeth situated closer to the lamination so that at most two pole teeth are situated between the lamination and the feed through of said winding wire.

2. A direct current motor comprising:
    at least four exciter poles in the stator;
    a commutator rotor including a number of slots and pole teeth on the commutator rotor's circumference, the number of pole teeth deviating from the number of exciter poles:
    a rotor winding with a number of individual tooth coils being equal to the number of commutator laminations, the number of commutator laminations being at least twice the number of pole teeth,
    wherein the individual tooth coils are wound onto the pole teeth so as to be evenly distributed, continuously wound, and contact connection lugs of the commutator laminations with a predetermined lamination interstice length, the predetermined lamination interstice length ensuring that an end of each coil is contacted to a free lamination;
    wherein the continuously wound coils are wound onto a pole tooth with a lowest electrical angular error in relation to a pole division;
    wherein the rotor winding is produced according to the distinguishing features of claim 1.

* * * * *

UNITED STATES PATENT AND TRADEMARK OFFICE
CERTIFICATE OF CORRECTION

PATENT NO. : 8,698,370 B2  Page 1 of 1
APPLICATION NO. : 12/918494
DATED : April 15, 2014
INVENTOR(S) : Gerald Roos It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 563 days.

Signed and Sealed this
Twenty-ninth Day of September, 2015

Michelle K. Lee
*Director of the United States Patent and Trademark Office*